US010133516B2

United States Patent
Ben Dayan et al.

(10) Patent No.: US 10,133,516 B2
(45) Date of Patent: *Nov. 20, 2018

(54) QUALITY OF SERVICE MANAGEMENT IN A DISTRIBUTED STORAGE SYSTEM

(71) Applicant: Weka.IO LTD, Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL); Tomer Filiba, Tel Aviv (IL)

(73) Assignee: Weka.IO Ltd. (IL)

( * ) Notice: Subject to any disclaimer, the term of this patent is extended or adjusted under 35 U.S.C. 154(b) by 16 days.

This patent is subject to a terminal disclaimer.

(21) Appl. No.: 15/599,737

(22) Filed: May 19, 2017

(65) Prior Publication Data

US 2017/0255642 A1 Sep. 7, 2017

Related U.S. Application Data

(63) Continuation-in-part of application No. 15/075,129, filed on Mar. 19, 2016, now Pat. No. 9,686,359.

(60) Provisional application No. 62/288,106, filed on Jan. 28, 2016, provisional application No. 62/366,297, filed on Jul. 25, 2016.

(51) Int. Cl.

| | |
|---|---|
| *G06F 3/06* | (2006.01) |
| *H04L 29/08* | (2006.01) |
| *G06F 17/30* | (2006.01) |
| *H04L 29/06* | (2006.01) |
| *H04L 12/801* | (2013.01) |
| *H04L 12/851* | (2013.01) |
| *H04L 12/835* | (2013.01) |

(52) U.S. Cl.
CPC ........ *G06F 3/067* (2013.01); *G06F 17/30194* (2013.01); *H04L 47/12* (2013.01); *H04L 67/06* (2013.01); *H04L 67/1097* (2013.01); *H04L 67/42* (2013.01); *H04L 47/11* (2013.01); *H04L 47/24* (2013.01); *H04L 47/30* (2013.01)

(58) Field of Classification Search
CPC ......... G06F 17/30132; G06F 17/30194; G06F 3/0656; G06F 3/067; H04L 47/11; H04L 47/12; H04L 47/24; H04L 47/30
USPC ................................. 707/827; 709/213, 215
See application file for complete search history.

(56) References Cited

U.S. PATENT DOCUMENTS

| | | | |
|---|---|---|---|
| 6,484,145 | B1 | 11/2002 | Horne et al. |
| 6,938,085 | B1 | 8/2005 | Belkin et al. |

(Continued)

*Primary Examiner* — Vincent F Boccio
(74) *Attorney, Agent, or Firm* — McAndrews, Held & Malloy, Ltd.

(57) ABSTRACT

One or more computing devices may comprise congestion management circuitry, one or more client file system request buffers, and DESS interface circuitry. The one or more client file system request buffers is/are operable to queue first client file system requests of a first priority level and second client file system requests of a second priority level, where the first priority level is higher priority than the second priority level. The DESS interface circuitry is operable to determine a choking level according to the load on a plurality of DESS resources. Individual load values of the DESS resources are mapped to a composite load value using a first function. The composite load value is mapped to a congestion contribution using a second function. And, the congestion contribution is mapped to a choking level using a third function.

20 Claims, 13 Drawing Sheets

(56) References Cited

U.S. PATENT DOCUMENTS

| | | |
|---|---|---|
| 7,447,839 B2 | 11/2008 | Uppala |
| 7,877,511 B1 | 1/2011 | Berger et al. |
| 8,347,010 B1 | 1/2013 | Radovanovic |
| 8,918,478 B2 | 12/2014 | Ozzie et al. |
| 9,686,359 B1 * | 6/2017 | Ben Dayan ......... H04L 67/1097 |
| 2003/0115218 A1 | 6/2003 | Bobbitt et al. |
| 2004/0098415 A1 | 5/2004 | Bone et al. |
| 2005/0204045 A1 | 9/2005 | Belkin et al. |
| 2005/0289152 A1 | 12/2005 | Earl et al. |
| 2011/0119518 A1 | 5/2011 | Orfitelli |
| 2013/0103787 A1 | 4/2013 | Glover et al. |
| 2014/0105218 A1 * | 4/2014 | Anand ................ H04L 47/6255 |
| | | 370/412 |
| 2014/0244897 A1 | 8/2014 | Goss et al. |
| 2014/0281280 A1 | 9/2014 | Goss et al. |
| 2015/0210095 A1 | 7/2015 | Anzai |
| 2015/0248366 A1 | 9/2015 | Bergsten et al. |
| 2015/0254088 A1 | 9/2015 | Chou et al. |
| 2015/0355971 A1 | 12/2015 | Becker-Szendy et al. |

\* cited by examiner

QUALITY OF SERVICE MANAGEMENT IN A DISTRIBUTED STORAGE SYSTEM

PRIORITY CLAIM

This application is a continuation-in-part of U.S. patent application Ser. No. 15/075,129 titled "Quality of Service Management in a Distributed Storage System" and filed on Mar. 19, 2016. This application also claims priority to the following provisional applications:
- U.S. Provisional Patent Application 62/288,106 titled "Congestion Mitigation in a Distributed Storage System" filed on Jan. 28, 2016.
- U.S. Provisional Patent Application 62/366,297 titled "Quality of Service Management in a Distributed Storage System" filed on Jul. 25, 2016.

Each of the aforementioned applications is hereby incorporated herein by reference in its entirety.

INCORPORATION BY REFERENCE

Each of the following documents is hereby incorporated herein by reference in its entirety:
- U.S. patent application Ser. No. 14/789,422 titled "Virtual File System Supporting Multi-Tiered Storage" and filed on Jul. 1, 2015;
- U.S. patent application Ser. No. 14/833,053 titled "Distributed Erasure Coded Virtual File System" and filed on Aug. 22, 2015;
- U.S. patent application Ser. No. 15/041,123 titled "Congestion Mitigation in a Distributed Storage System" and filed on Feb. 11, 2016;
- U.S. patent application Ser. No. 15/041,236 titled "Resource Monitoring in a Distributed Storage System" and filed on Feb. 11, 2016;
- U.S. patent application Ser. No. 15/052,525 titled "Management of File System Requests in a Distributed Storage System" and filed on Feb. 24, 2016; and
- U.S. patent application Ser. No. 15/061,518 titled "Congestion Mitigation in a Multi-Tiered Distributed Storage System" and filed on Mar. 4, 2016.

BACKGROUND

Limitations and disadvantages of conventional approaches to data storage will become apparent to one of skill in the art, through comparison of such approaches with some aspects of the present method and system set forth in the remainder of this disclosure with reference to the drawings.

BRIEF SUMMARY

Methods and systems are provided for quality of service management in a in a distributed storage system substantially as illustrated by and/or described in connection with at least one of the figures, as set forth more completely in the claims.

DETAILED DESCRIPTION

Figure 1:
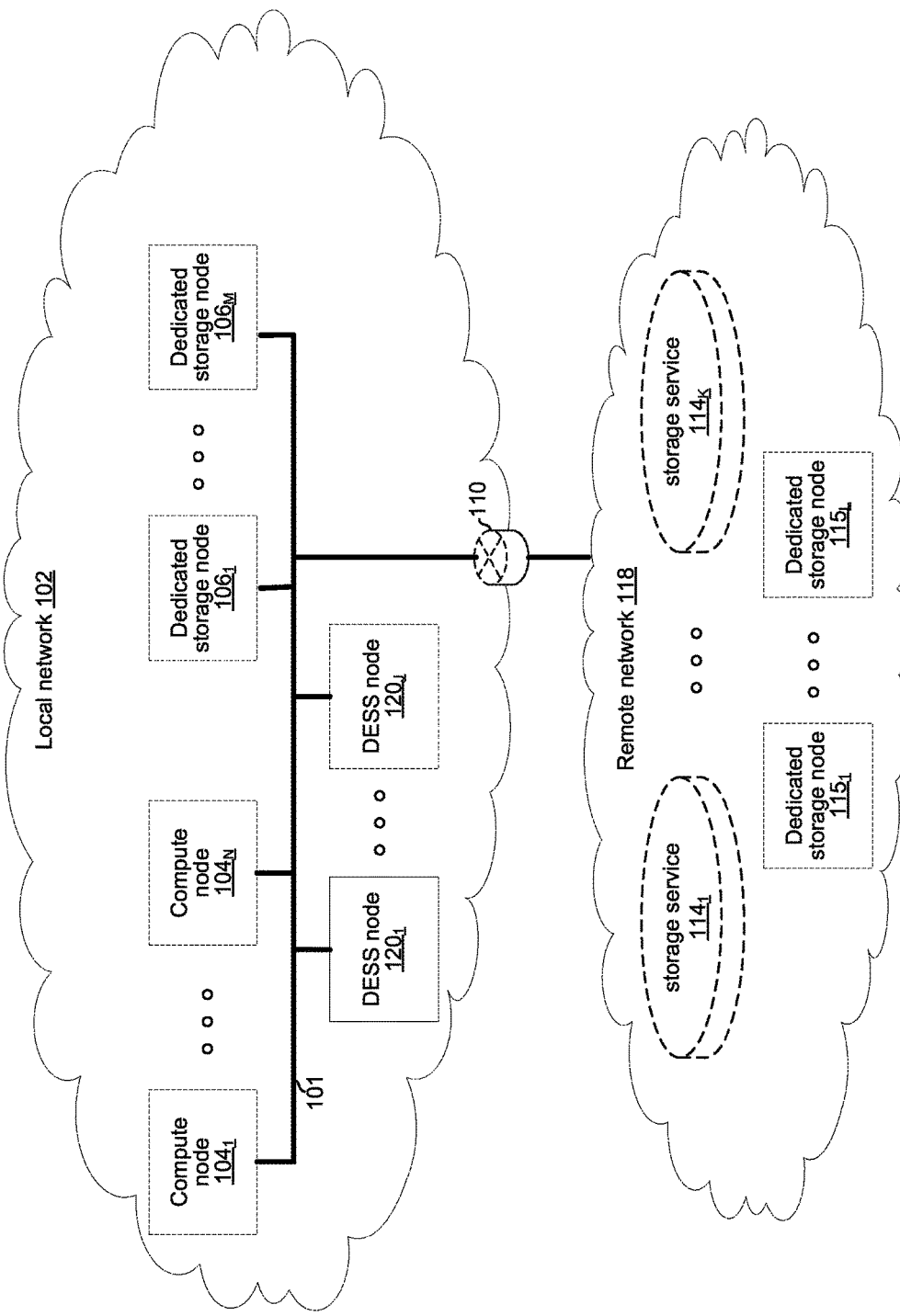
FIG. 1 illustrates various example configurations of a distributed electronic storage system (DESS) in accordance with aspects of this disclosure.

FIG. 1 illustrates various example configurations of a distributed electronic storage system in accordance with aspects of this disclosure. Shown in FIG. 1 is a local area network (LAN) 102 comprising one or more distributed electronic storage system (DESS) nodes 120 (indexed by integers from 1 to J, for $j \geq 1$), and optionally comprising (indicated by dashed lines): one or more dedicated storage nodes 106 (indexed by integers from 1 to M, for $M \geq 1$), one or more compute nodes 104 (indexed by integers from 1 to N, for $N \geq 1$), and/or an edge router 110 that connects the LAN 102 to a remote network 118. The remote network 118 optionally comprises one or more storage services 114 (indexed by integers from 1 to K, for $K \geq 1$), and/or one or more dedicated storage nodes 115 (indexed by integers from 1 to L, for $L \geq 1$). The nodes of the LAN 102 are communicatively coupled via interconnect 101 (e.g., copper cables, fiber cables, wireless links, switches, bridges, hubs, and/or the like).

Each compute node $104_n$ (n an integer, where $1 \leq n \leq N$) is a networked computing device (e.g., a server, personal computer, or the like) that comprises circuitry for running a variety of client processes (either directly on an operating system of the node $104_n$ and/or in one or more virtual machines/containers running on the device $104_n$) and for interfacing with one or more DESS nodes 120. As used in this disclosure, a "client process" is a process that reads data from storage and/or writes data to storage in the course of performing its primary function, but whose primary function is not storage-related (i.e., the process is only concerned that its data is reliably stored and retrievable when needed, and not concerned with where, when, or how the data is stored). Example applications which give rise to such processes include: an email server application, a web server application, office productivity applications, customer relationship management (CRM) applications, and enterprise resource planning (ERP) applications, just to name a few. Example configurations of a compute node $104_n$ are described below with reference to FIG. 2.

Each DESS node $120_j$ (j an integer, where $1 \leq j \leq J$) is a networked computing device (e.g., a server, personal computer, or the like) that comprises circuitry for running DESS processes and, optionally, client processes (either directly on an operating system of the device $104_n$ and/or in one or more virtual machines running in the device $104_n$). As used in this disclosure, a "DESS process" is a process that implements aspects of one or more of: the DESS driver, the DESS front end, the DESS back end, and the DESS memory controller described below in this disclosure (any one or more of which may implement one or more choking processes, as described below). Thus, in an example implementation, resources (e.g., processing and memory resources) of the DESS node $120_j$ may be shared among client processes and DESS processes. The processes of the DESS may be configured to demand relatively small amounts of the resources to minimize the impact on the performance of the client processes. From the perspective of the client process(es), the interface with the DESS may be independent of the particular physical machine(s) on which the DESS process(es) are running. Example configurations of a DESS node $120_j$ are described below with reference to FIG. 3.

Each on-premises dedicated storage node $106_m$ (m an integer, where $1 \leq m \leq M$) is a networked computing device and comprises one or more storage devices and associated circuitry for making the storage device(s) accessible via the LAN 102. An example configuration of a dedicated storage node $106_m$ is described below with reference to FIG. 4.

Each storage service $114_k$ (k an integer, where $1 \leq k \leq K$) may be a cloud-based service such as Amazon S3, Microsoft Azure, Google Cloud, Rackspace, Amazon Glacier, and Google Nearline.

Each remote dedicated storage node $115_l$ (l an integer, where $1 \leq l \leq L$) may be similar to, or the same as, an on-premises dedicated storage node 106. In an example implementation, a remote dedicated storage node $115_l$ may store data in a different format and/or be accessed using different protocols than an on-premises dedicated storage node 106 (e.g., HTTP as opposed to Ethernet-based or RDMA-based protocols).

Figure 2:
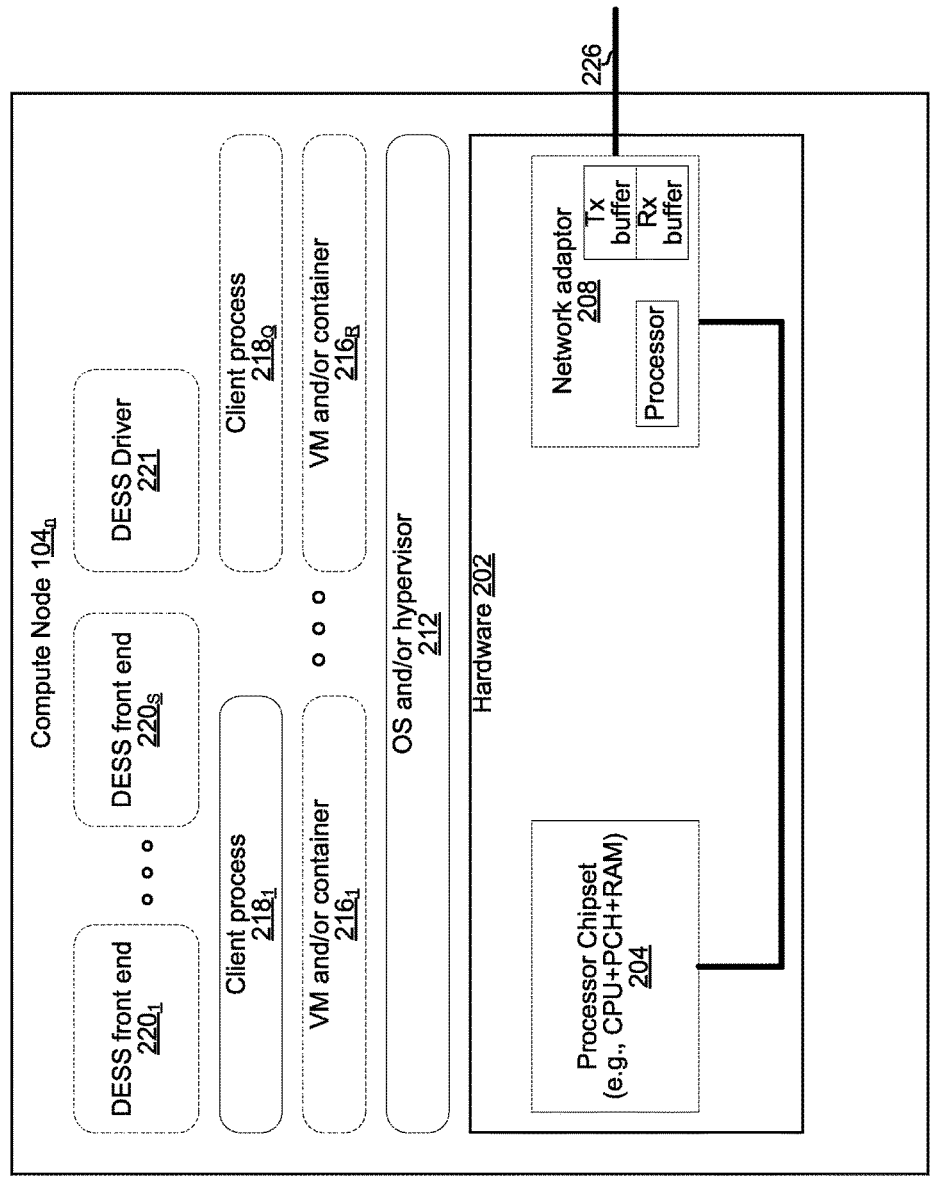
FIG. 2 illustrates various example configurations of a compute node that uses a distributed electronic storage system in accordance with aspects of this disclosure.

FIG. 2 illustrates various example configurations of a compute node that uses a DESS in accordance with aspects of this disclosure. The example compute node $104_n$ comprises hardware 202 that, in turn, comprises a processor chipset 204 and a network adaptor 208.

The processor chipset 204 may comprise, for example, an x86-based chipset comprising a single or multi-core processor system on chip, one or more RAM ICs, and a platform controller hub IC. The chipset 204 may comprise one or more bus adaptors of various types for connecting to other components of hardware 202 (e.g., PCIe, USB, SATA, and/or the like).

The network adaptor 208 may, for example, comprise circuitry for interfacing to an Ethernet-based and/or RDMA-based network. In an example implementation, the network adaptor 208 may comprise a processor (e.g., an ARM-based processor) and one or more of the illustrated software components may run on that processor. The network adaptor 208 interfaces with other members of the LAN 100 via (wired, wireless, or optical) link 226. In an example implementation, the network adaptor 208 may be integrated with the chipset 204.

Software running on the hardware 202 of compute node $104_n$ includes at least: an operating system and/or hypervisor 212, one or more client processes 218 (indexed by integers from 1 to Q, for $Q \geq 1$) and one or both of: a DESS driver 221 and DESS front end 220. Additional software that may optionally run on the compute node $104_n$ includes: one or more virtual machines (VMs) and/or containers 216 (indexed by integers from 1 to R, for $R \leq 1$).

Each client process $218_q$ (q an integer, where $1 \leq q \leq Q$) may run directly on an operating system/hypervisor 212 or may run in a virtual machine and/or container $216_r$ (r an integer, where $1 \leq r \leq R$) serviced by the OS and/or hypervisor 212.

The DESS driver 221 is operable to receive/intercept local file system commands (e.g., POSIX commands) and generate corresponding file system requests (e.g., read, write, create, make directory, remove, remove directory, link, etc.) to be transmitted to a DESS front-end (either locally or via the interconnect 101). In some instances, the file system requests transmitted on the interconnect 101 may be of a format customized for use with the DESS front end 220 and/or DESS back end 222 described herein. In some instances, the file system requests transmitted on the interconnect 101 may adhere to a standard such as Network File System (NFS), Server Message Block (SMB), Common Internet File System (CIFS), and/or the like.

Each DESS front end instance $220_s$ (s an integer, where $1 \leq s \leq S$ if at least one front end instance is present on compute node $104_n$) provides an interface for routing file system requests to an appropriate DESS back end instance (running on a DESS node), where the file system requests may originate from one or more of the client processes 218, one or more of the VMs and/or containers 216, and/or the OS and/or hypervisor 212. Each DESS front end instance $220_s$ may run on a processor of chipset 204 or on a processor of the network adaptor 208. For a multi-core processor of chipset 204, different instances of the DESS front end 220 may run on different processing cores.

Figure 3:
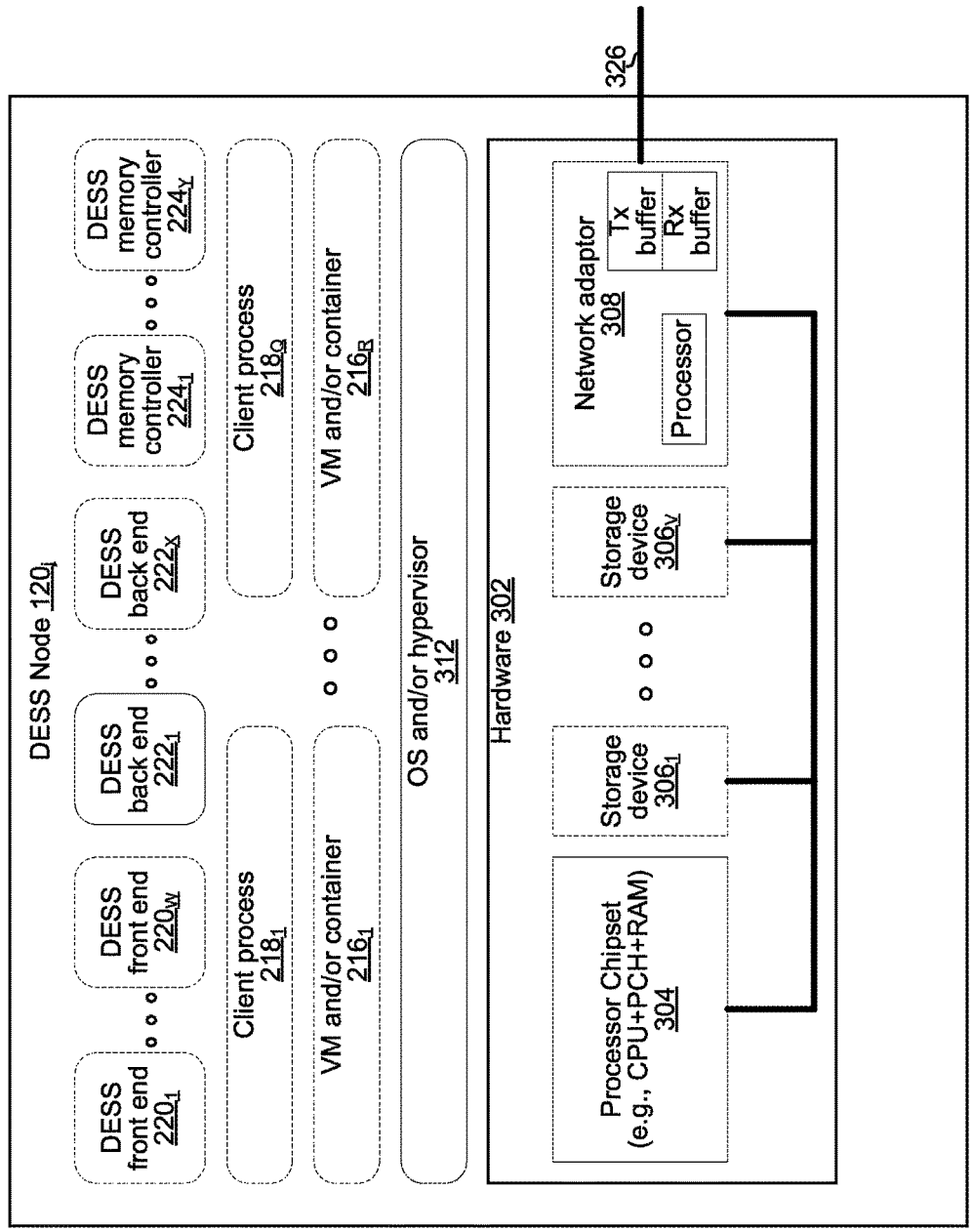
FIG. 3 illustrates various example configurations of a distributed electronic storage system node in accordance with aspects of this disclosure.

FIG. 3 shows various example configurations of a distributed electronic storage system node in accordance with aspects of this disclosure. The example DESS node $120_j$ comprises hardware 302 that, in turn, comprises a processor chipset 304, a network adaptor 308, and, optionally, one or more storage devices 306 (indexed by integers from 1 to W, for $W \geq 1$).

Each storage device $306_p$ (p an integer, where $1 \leq p \leq P$ if at least one storage device is present) may comprise any suitable storage device for realizing a tier of storage that it is desired to realize within the DESS node $120_j$.

The processor chipset 304 may be similar to the chipset 204 described above with reference to FIG. 2. The network adaptor 308 may be similar to the network adaptor 208 described above with reference to FIG. 2 and may interface with other nodes of LAN 100 via link 326.

Software running on the hardware 302 includes at least: an operating system and/or hypervisor 212, and at least one of: one or more instances of DESS front end 220 (indexed by integers from 1 to W, for $W \geq 1$), one or more instances of DESS back end 222 (indexed by integers from 1 to X, for $X \geq 1$), and one or more instances of DESS memory controller 224 (indexed by integers from 1 to Y, for $Y \geq 1$). Additional software that may optionally run on the hardware 302 includes: one or more virtual machines (VMs) and/or containers 216 (indexed by integers from 1 to R, for $R \geq 1$), and/or one or more client processes 318 (indexed by integers from 1 to Q, for $Q \geq 1$). As mentioned above, DESS processes and client processes may share resources on a DESS node.

The client processes 218 and VM(s) and/or container(s) 216 are as described above with reference to FIG. 2.

Each DESS front end instance $220_w$ (w an integer, where $1 \leq w \leq W$, if at least one front end instance is present on DESS node $120_j$) provides an interface for routing file system requests to an appropriate DESS back end instance (running on the same or a different DESS node), where the file system requests may originate from one or more of the client processes 218, one or more of the VMs and/or containers 216, and/or the OS and/or hypervisor 212. Each DESS front end instance $220_w$ may run on the processor of chipset 304 or on the processor of the network adaptor 308. For a multi-core processor of chipset 304, different instances of the DESS front end 220 may run on different processing cores.

Each DESS back end instance $222_x$ (x an integer, where $1 \leq x \leq X$, if at least one back end instance is present on DESS node $120_j$) services the file system requests that it receives and carries out tasks to otherwise manage the DESS (e.g., load balancing, journaling, maintaining metadata, caching, moving of data between tiers, removing stale data, correcting corrupted data, etc.) Each DESS back end instance $222_x$ may run on the processor of chipset 304 or on the processor of the network adaptor 308. For a multi-core processor of chipset 304, different instances of the DESS back end 222 may run on different processing cores.

Each DESS memory controller instance $224_u$ (u an integer, where $1 \leq u \leq U$, if at least DESS memory controller instance is present on DESS node $120_j$) handles interactions with a respective storage device 306 (which may reside in the DESS node 120j or another DESS node 120 or a storage node 106). This may include, for example, translating addresses, and generating the commands that are issued to the storage device (e.g., on a SATA, PCIe, or other suitable bus). Thus, the DESS memory controller instance $224_u$ operates as an intermediary between a storage device and the various DESS back end instances of the DESS.

Figure 4:
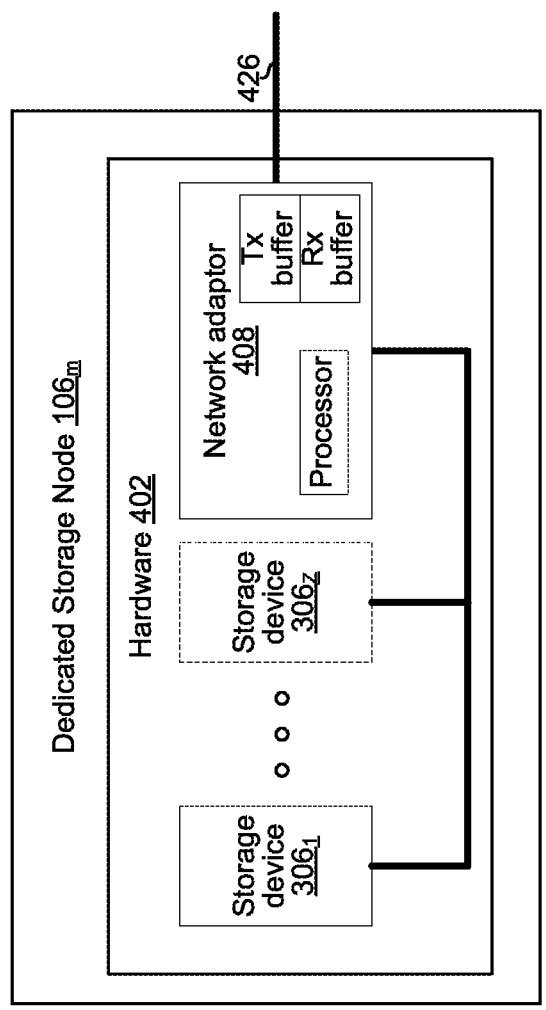
FIG. 4 illustrates various example configurations of a dedicated storage node in accordance with aspects of this disclosure.

FIG. 4 illustrates various example configurations of a dedicated storage node in accordance with aspects of this disclosure. The example dedicated storage node $106_m$ comprises hardware 402 which, in turn, comprises a network adaptor 408 and at least one storage device 306 (indexed by integers from 1 to Z, for $Z \geq 1$). Each storage device $306_z$ may be the same as storage device $306_w$ described above with reference to FIG. 3. The network adaptor 408 may comprise circuitry (e.g., an ARM-based processor) and a bus (e.g., SATA, PCIe, or other) adaptor operable to access (read, write, etc.) storage device(s) $406_1$-$406_Z$ in response to commands received over network link 426. The commands may adhere to a standard protocol. For example, the dedicated storage node $106_m$ may support RDMA based protocols (e.g., Infiniband, RoCE, iWARP etc.) and/or protocols which ride on RDMA (e.g., NVMe over fabrics).

In an example implementation, tier 1 memory is distributed across one or more storage devices 306 (e.g., FLASH devices) residing in one or more storage node(s) 106 and/or one or more DESS node(s) 120. Data written to the DESS is initially stored to Tier 1 memory, and then migrated to one or more other tier(s) as dictated by data migration policies, which may be user-defined and/or adaptive based on machine learning.

Figure 5:
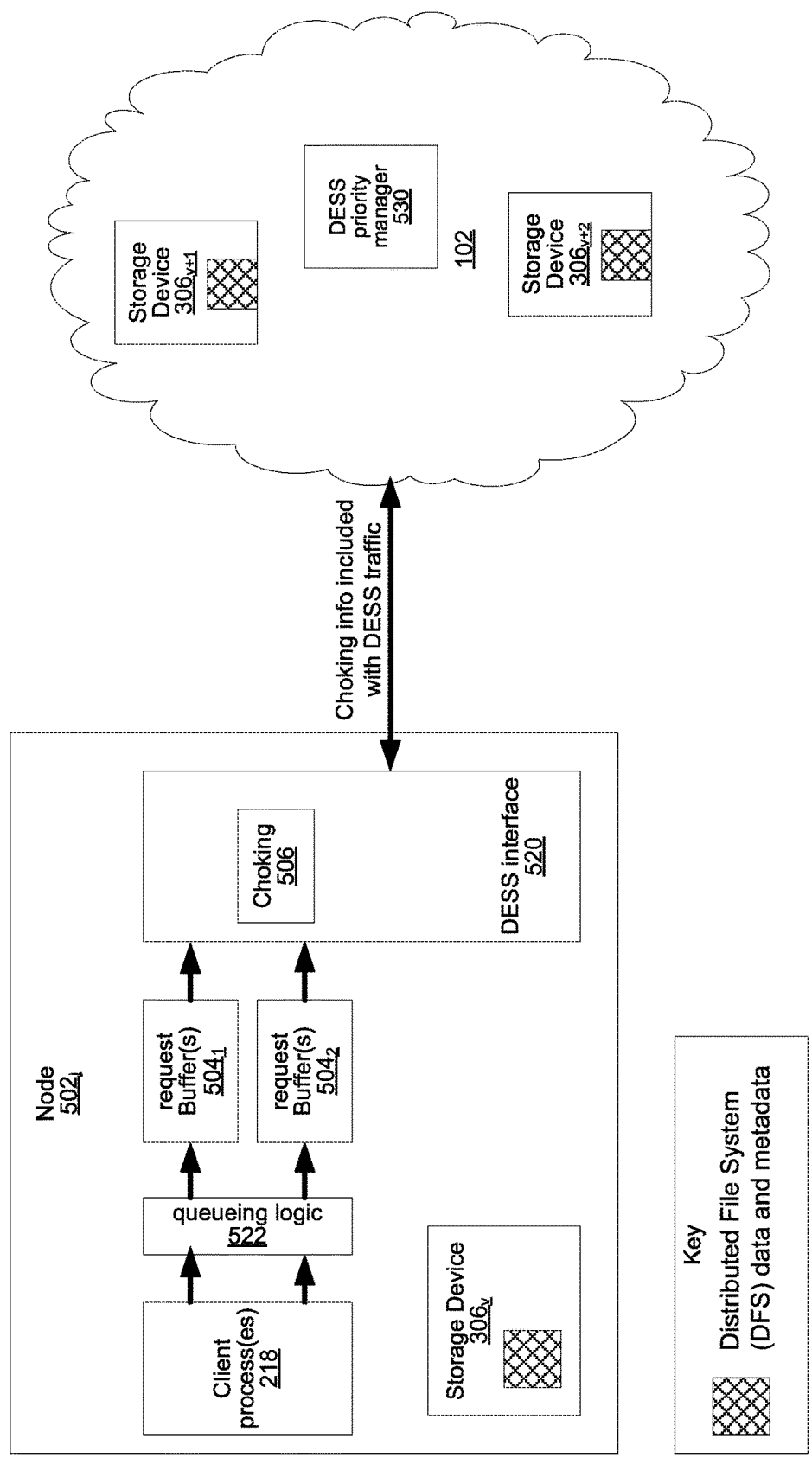
FIG. 5 illustrates a first example implementation of a DESS with quality of service management capabilities in accordance with aspects of this disclosure.

FIG. 5 illustrates a first example implementation of a DESS with quality of service management capabilities in accordance with aspects of this disclosure. The example node $502_j$, which may be a DESS node 120 or compute node 104, for example, comprises circuitry configured to implement a client process 218, file system request buffers $504_1$ and $504_2$, a DESS interface 520, a storage device $306_v$, buffering control circuitry 522, one or more file system choking process(es) 506, and a centralized DESS priority manager 530.

The file system request buffers $504_1$ and $504_2$ may, for example, reside in memory of the chipset 204 (FIG. 2) or 304 (FIG. 3). Although two buffers and corresponding mount points are used for illustration, any number of mount points and corresponding buffers 504 may be present in any particular implementation. Each of buffers $504_1$ and $504_2$ may buffer client file system requests directed to a respective one of a plurality of file system mount points. For example, using Linux file paths for illustration, buffer $504_1$ may buffer client file system requests directed to "/mount-point-1" and buffer $504_2$ may buffer client file system directed to "/mount-point-2." As another example using Windows file paths, buffer $504_1$ may buffer client file system requests directed to "X:" and buffer $504_2$ may buffer client file system directed to "Y:."

The different buffers $504_1$ and $504_2$ may be given different priority by the DESS interface 520, and thus sending client file system requests directed to different mount points get different priority. Different mount points may correspond to different distributed file systems, or may point to the same distributed file system. For example, the file paths "/mount-point-1/dir1/file-1.txt" and "/mount-point-2/dir1/file-1.txt" may point to the same file, but client file system requests directed to the former may be given a higher priority level than client file system requests directed to the latter. For illustration, it is assumed both buffers $504_1$ and $504_2$ buffer client file system requests for a distributed file system that is distributed across storage devices $306_v$, $306_{v+1}$, and $306_{v+2}$.

The client process 218 may be as described above with reference to FIGS. 1-4. The client process 218 submits file system requests to the DESS and those file system requests are buffered in file system request buffers $504_1$ and $504_2$.

The DESS interface 520 comprises circuitry configured to implement one or more DESS driver instances 221, DESS front-end instances 220, and/or one or more DESS back-end instances 222, which may, in turn, perform the choking process(es) 506.

The file system choking process(es) 506 control the rate at which the file system requests in the buffers $504_1$ and $504_2$ are fetched by the interface 520 so as to manage congestion in (and, thus, quality of service provided by) the DESS.

Also shown in a centralized DESS priority manager 530 which is operable to store, manage, and distribute information used by the choking process(es) 506. The information stored and managed by the central choking manager 530 is information such that its centralization reduces administrative overhead of implementing congestion management in the DESS. That is, the centralized DESS priority manager 530 may store information which is likely to be common among all or most nodes of the DESS such that the information can be set/updated once and then automatically propagate to all the nodes 502 that need it (rather than having to set/update the information locally on each node 502). For clarity of illustration, the centralized DESS priority manager 530 is shown residing in another device 502 of the network 102, but node $502_j$ could just as easily have been selected as the node 502 which hosts the centralized DESS priority manager 530. As discussed further below, the information may comprise, for example, a data structure indicating which priority levels should be assigned to various client file system requests (e.g., based on the file system associated with the client file system requests, based on the node from which the client file system requests originate, based on the client process from which the client file system requests originate, and/or the like).

In operation, the interface 520 fetches batches of file system requests from the buffers $504_1$ and $504_2$, determines which back end instance(s) 222 should service the request(s), generates the appropriate DESS message(s) for conveying the request(s) to the back end(s) 222, and transmits DESS message(s) to the determined back end(s) 222 via the network 102. The back end(s) 222 (possibly including a back end instance 222 of the DESS interface 520 of Node $120_1$) receive the DESS message(s) and perform the necessary operations to carry out the file system request (typically involving reading and/or writing data and/or metadata from/to one or more storage device(s) 306). The rate at which the file system requests are fetched from the buffers $504_1$ and $504_2$ is controlled by the choking process(es) 506. In an example implementation, this comprises the choking process(es) 506 determining a choking level (e.g., determined as described below with respect to FIGS. 9A-9D and in the above incorporated U.S. patent application Ser. No. 15/041,123 titled "Congestion Mitigation in a Distributed Storage System" and filed on Feb. 11, 2016) and then adjusting one or more choking settings based on the determined choking level. The one or more settings may comprise, for example: one or more batch timing setting, and one or more batch size setting (i.e., how many file system requests are fetched from the buffer 504 at a time). In an example implementation, the buffers $504_1$ and $504_2$ may be serviced using round-robin scheduling. In an example implementation using round-robin scheduling, the batch timing setting(s) may determine amount of time between rounds or sub-rounds of the round robin, and/or determine duration of each round or sub-round of the round-robin. In an example implementation using round-robin scheduling, the batch size setting(s) may determine how many client file system requests, and/or a total size of client file system requests, to fetch from one or more of buffers $504_1$ and $504_2$ during each round or sub-round.

The choking settings (and thus the rate at which client file system requests are fetched) may be based on information about the state of the DESS. The state information may be based on the load on (i.e., level of usage of) resources of the DESS. The load may be a most-recently measured/recorded load or may be a predicted load based on historical measurement/recordings (for the same DESS and/or other DESSs) being input to a prediction algorithm. Such resources may include resources of the node $120_1$ (DESS resources "local" to node $120_1$). Such resources may also include similar resources of other nodes 104, $120_j$, and/or 106 of the DESS (DESS resources that are "remote" from the perspective of node $120_1$). Information about the loads on remote resources may be determined from DESS messages received from other nodes of the DESS. Similarly, the node $120_1$ may transmit DESS messages which indicate the loads on its resources. Such DESS messages may contain a direct representation of load on one or more resources and/or may contain values calculated based on the load no one or more resources. This bidirectional exchange of choking information gives choking processes 506 throughout the DESS a more holistic view of the state of the DESS, which enables them to more optimally control the rate at which they submit file system requests to the DESS as compared to if they had to control the rate based only on their respective local resource loads.

Resources for which resource load may be monitored include one or more of the following: storage device, CPU, network, and memory. A load on a storage device may, for example, be represented by a single value determined from depth of buffer 502, or represented by two values where the first is determined from depth of read buffer 710 and the second is determined from depth of write buffer 712. A load on a CPU may, for example, be represented by a value corresponding to a running average of percentage of available cycles per second being used. A load on a network adaptor or link may, for example, be represented by a single value determined from depth of transmit and/or receive buffers, or represented by two values where the first is determined from depth of a transmit buffer and the second is determined from depth of a receive buffer. A load on a memory may, for example, be represented by a single value determined from the amount of used (or free) memory.

Figure 6:
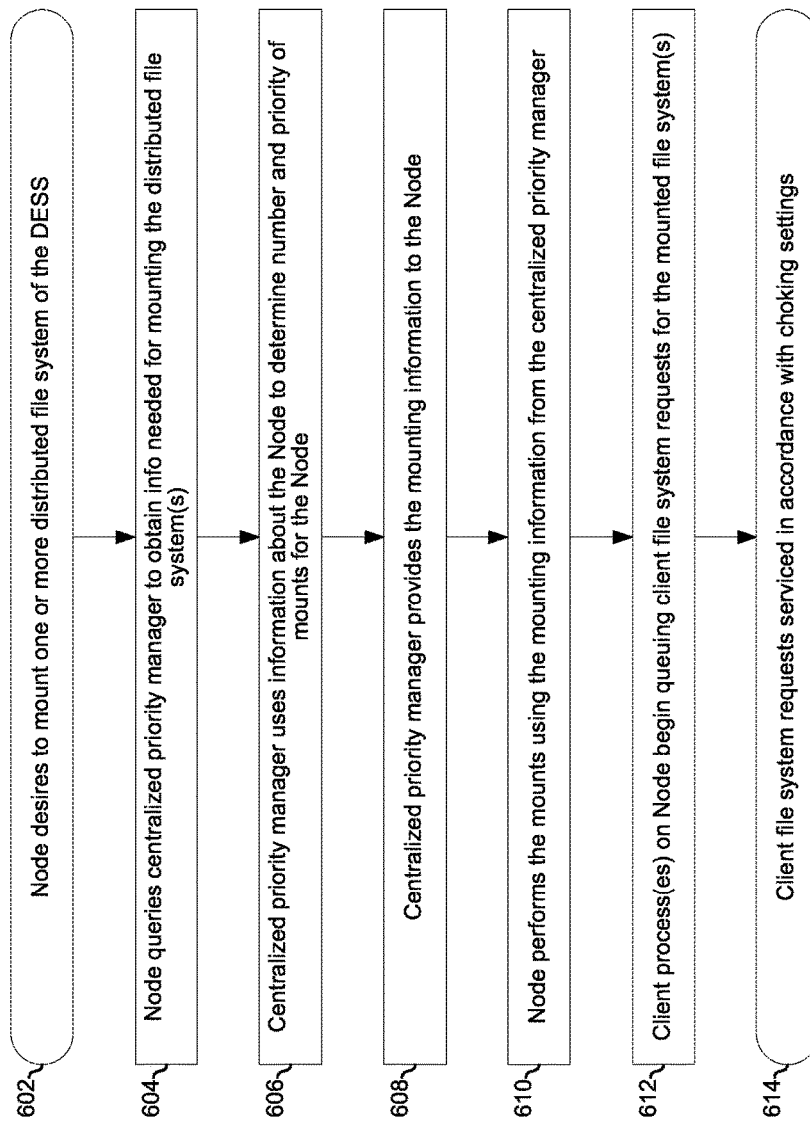
FIG. 6 is a flow chart illustrating an example process for managing quality of service in a DESS.

FIG. 6 is a flow chart illustrating an example process for managing quality of service in a DESS. The process begins in block 602 when node $502_j$ desires to mount one or more distributed file system of the DESS. This may, for example, be part of a start-up script that executes automatically when the node $502_j$ is powered on and/or connected to the DESS, may be in response to a command manually entered by a DESS administrator, and/or may be in response to a new client process being launched on the node $502_j$. After block 602, the process advances to block 604.

In block 604, the node $502_j$ sends a request to the centralized priority manager 530 to obtain information needed for mounting the distributed file system(s). This information may, for example, include the network address of the target file system, the mount point at which the target file system should be mounted on the node $502_j$, and/or other options which should be used when mounting the file system(s). After block 604, the process advances to block 606.

In block 606, the centralized priority manager 530 uses information about the node $502_j$ to determine number and priority of file system mounts that the node $502_j$ should use. The information about node $502_j$ may, for example, be received along with the request in block 604, may be obtained through the centralized priority manager 530 querying the node $502_j$, and/or may be retrieved from a centralized DESS configuration file. The information about the node $502_j$ may comprise, for example, what client processes (e.g., by name and/or version) are running on the node $502_j$, which types of traffic need to be accessed by the node $502_j$, which users and/or permissions are setup on the node $502_j$, what local resources (e.g., how much memory, how many processing cores, speed of its network connection, etc.) the node $502_j$ has available to it, and/or the like. After block 606, the process advances to block 608.

In block 608, the centralized priority manager 530 provides the mounting information (i.e., information about the target file system(s) to be mounted and the mount point(s) at which to mount it/them) to the node $502_j$. After block 608, the process advances to block 610.

In block 610, node $502_j$ mounts the file system(s) using the mounting information received from the centralized priority manager 530 in block 608. After block 610, the process advances to block 612. In block 612, one or more client process running on node $502_j$ begins generating client file system requests for the mounted file system(s). Queueing logic 522 inspects each of the client file system requests and queues it in an appropriate one of the buffers $502_1$ and $502_2$. After block 612, the process advances to block 614.

In block 614, the queued client file system requests are fetched from the buffers $502_1$ and/or $502_2$ and serviced in accordance with choking settings. Some examples of the manner in which the client file system requests are fetched from the buffers $502_1$ and $502_2$ for servicing by the DESS are described below with reference to FIGS. 7A and 7B.

As a more concrete example for illustration, the DESS may host a "Project-X" file system which stores all files for Project-X. Running on node $502j$ may be a "directory cleanup" client process and a "word processor" client process. The request from node $502_j$ may indicate that it wants the target address of the Project-X file system, and it wants to know at what mount point it should mount the Project-X file system for access by the directory cleanup process and for access by the word processor. The directory cleanup may operate in the background to, for example, remove temporary files, compress or migrate old files, etc., whereas the word processor may be in use by a human user. Accordingly, in order to improve user experience for the human user, the centralized priority manager 530 may be configured to give the word processor higher priority than the directory cleanup process when both are trying to access the Project-X file system. The centralized priority manager 530 may accordingly respond with instructions for the node $502j$ to mount the Project-X file system at a first, higher-priority mount point for use by the word processor and at a second, lower-priority mount point for use by the directory cleanup process.

In an example implementation, if the node $502j$ has proper permissions, it may modify or override the mounting information received in block 610 and/or the configuration dictated by the mounting information. In such an implementation, the majority of nodes 502 in a DESS may use the configuration(s) dictated by the centralized priority manager 530, but some node may use different, locally determined configurations.

Figure 7A:
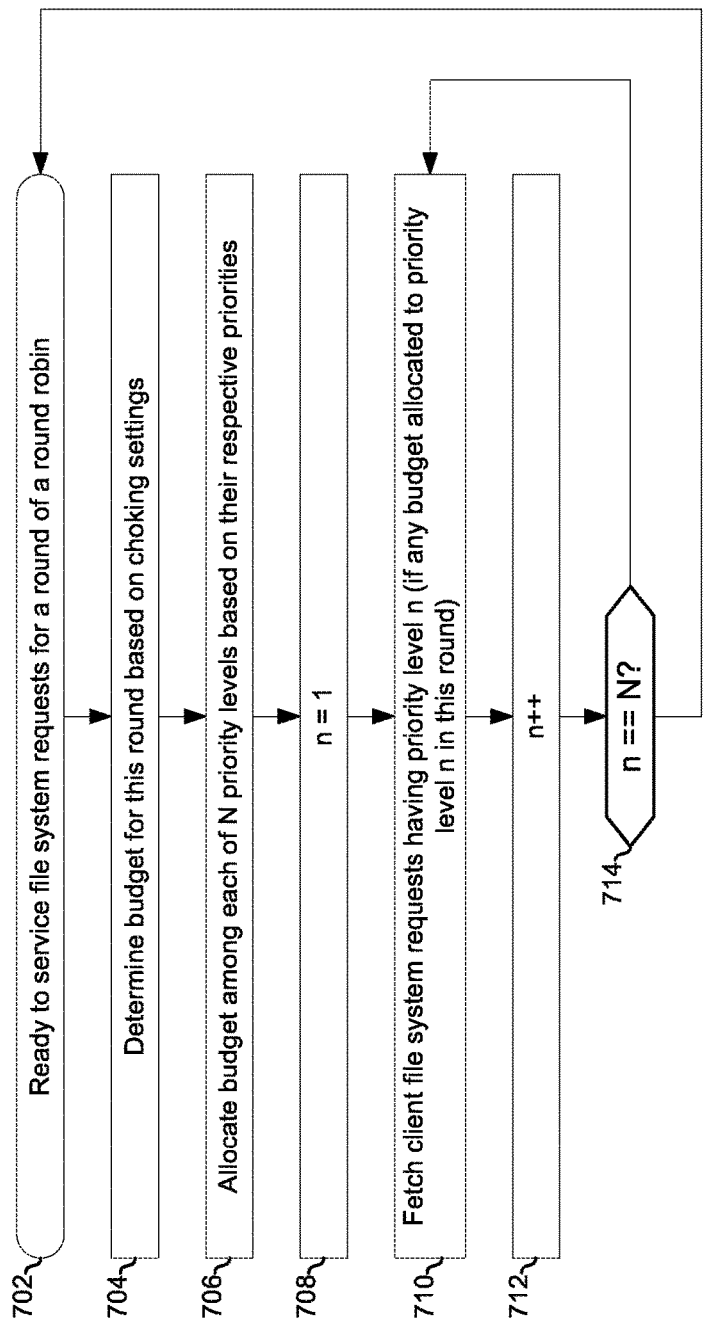
FIG. 7A is a flow chart illustrating example round-robin scheduling in a DESS.

FIG. 7A is a flow chart illustrating example round-robin scheduling in a DESS. The process begins with block 702 in which the DESS interface 520 is ready to service file system requests for a round of the round robin. After block 702, the process advances to block 704.

In block 704, the choking process(es) 506 determine a budget for the current round. In an example implementation, the budget is in terms of total number of normalized input/output operations (IOPs) to be performed during the round. The normalization is such that relatively small client file system requests (i.e., that require reading or writing relatively small amounts of information) are not starved of DESS resources by relatively large client file system requests (except to the extent dictated by their relative priority levels). The normalization may, for example, be relative to a number of IOPs determined by a DESS administrator and/or dynamically updated by choking process(es) 506 using machine learning algorithms. Such algorithm(s) may learn based on, for example, the fewest/average/most/etc. number of IOPs required for client file system request previously and/or currently queued in the buffers $504_1$ and $504_2$. Such algorithm(s) may learn based on, for example, number if IOPs allocated to the various priority levels in previous rounds of the round robins (e.g., if a priority level has not gotten any IOPs for a threshold number of rounds then it may be ensured to get at least a threshold number of IOPs in this round). After block 704, the process advances to block 706.

In block 706, the choking process(es) 506 allocate the budget determined block 704 among N mount points at which file systems of the DESS are mounted in the node $502_j$. Referring back briefly to FIG. 5, assuming that each of the buffers $504_1$ and $504_2$ is associated with a single mount point (which may not be the case where it is desired to treat two or more priority levels as a single priority level), then N=2 in the example of FIG. 5 and the budget is allocated among the two mount points according to their respective priority levels. In an example implementation, the allocation uses one or more look-up tables where the portion of the budget to be allocated to any particular mount point n depends on the priority level of the mount point and the current level of congestion in the DESS. As just one arbitrary example, it may be that (using A, B, C, J, K, L, X, Y, and Z as stand-ins for real values):

when the choking level is X or less, client file system requests of priority level A get J IOPs per round, client file system requests of priority level B get K IOPS per round, and client file system requests of priority level C get L IOPs per round;

when the choking level is Y or less, then client file system requests of priority level A get K IOPs per round, client file system requests of priority level B get L IOPs per round, and client file system requests of priority level C don't get any IOPs; and when the choking level is greater than Y, then client file system requests of priority level A get L IOPs per round, client file system requests of priority levels B and C don't get any IOPs.

where J, K, and L may, for example, be absolute numbers or percentages of the budget determined in block 704. After block 706, the process advances to block 708.

In block 708, a variable 'n' is initialized to 1. After block 708, the process advances to block 710.

In block 710, if a sufficient number of IOPs have been allocated to priority level 'n' such that at least one client file system request of priority level 'n' can be serviced, then such fetch(es) is/are performed and the client file system requests are serviced by the DESS.

In block 712, the variable 'n' is incremented. After block 712, the process advances to block 714.

In block 714, if the variable n is not equal to N (i.e., not all priority levels have been serviced during this round), then the process returns to block 710. Otherwise, the process returns to block 702 for the next round of the round robin.

Figure 7B:
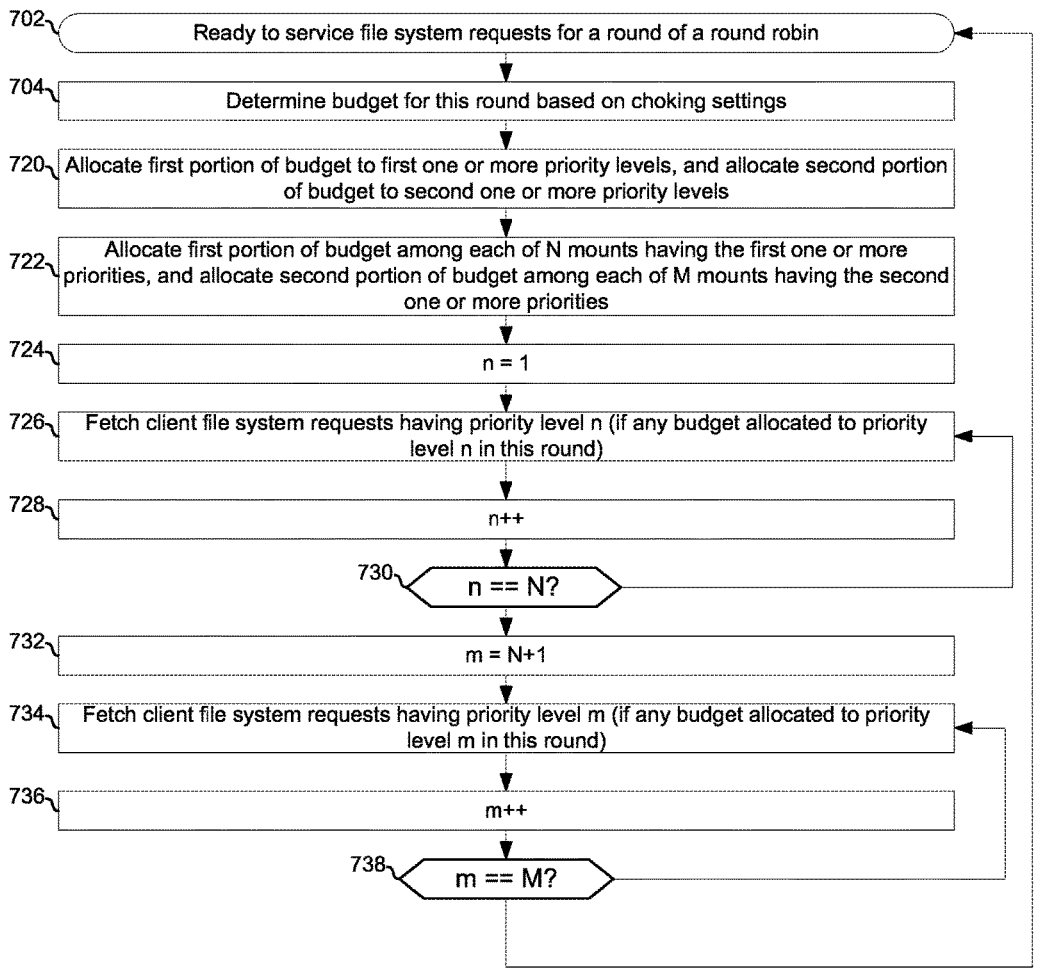
FIG. 7B is a flow chart illustrating example round-robin scheduling in a DESS.

FIG. 7B is a flow chart illustrating example round-robin scheduling in a DESS. The process again begins with blocks 702 and 704 before proceeding to block 720.

In block 720, a first portion of the budget determined in block 704 is allocated to a first one or more priority levels, and a second portion of the budget determined in block 704 is allocated to a second one or more priority levels. The allocation of each portion may, for example, be as described above with reference to block 706 of FIG. 7A. For illustration, it is assumed in FIG. 7B that there are M priority levels and the first portion of the budget is allocated to levels 1 through N and the second portion of the budget is allocated to levels N+1 through M. After block 720, the process advances to block 722.

In block 722, the first portion of the budget is allocated among priority levels 1 through N and the second portion of the budget is allocated among priority levels N+1 through M. The allocation of each portion may, for example, be as described above with reference to block 706 of FIG. 7A.

In block 724, a variable 'n' is initialized to 1. After block 724, the process advances to block 726.

In block 726, if a sufficient number of IOPs have been allocated to priority level 'n' such that at least one client file system request of priority level 'n' can be serviced, then such fetch(es) is/are performed and the client file system requests are serviced by the DESS.

In block 728, the variable 'n' is incremented. After block 728, the process advances to block 730.

In block 730, if the variable n is not equal to N (i.e., not all priority levels have been serviced during this sub-round comprising blocks 724 through 730), then the process returns to block 726. Otherwise, the process advances to block 732.

In block 732, a variable 'm' is initialized to 1. After block 732, the process advances to block 734.

In block 734, if a sufficient number of IOPs have been allocated to priority level 'n' such that at least one client file system request of priority level 'm' can be serviced, then such fetch(es) is/are performed and the client file system requests are serviced by the DESS.

In block 736, the variable 'm' is incremented. After block 736, the process advances to block 738.

In block 738, if the variable m is not equal to M (i.e., not all priority levels have been serviced during this sub-round comprising blocks 732 through 730), then the process returns to block 734. Otherwise, the process returns to block 702 for the next round of the round-robin.

Figure 8:
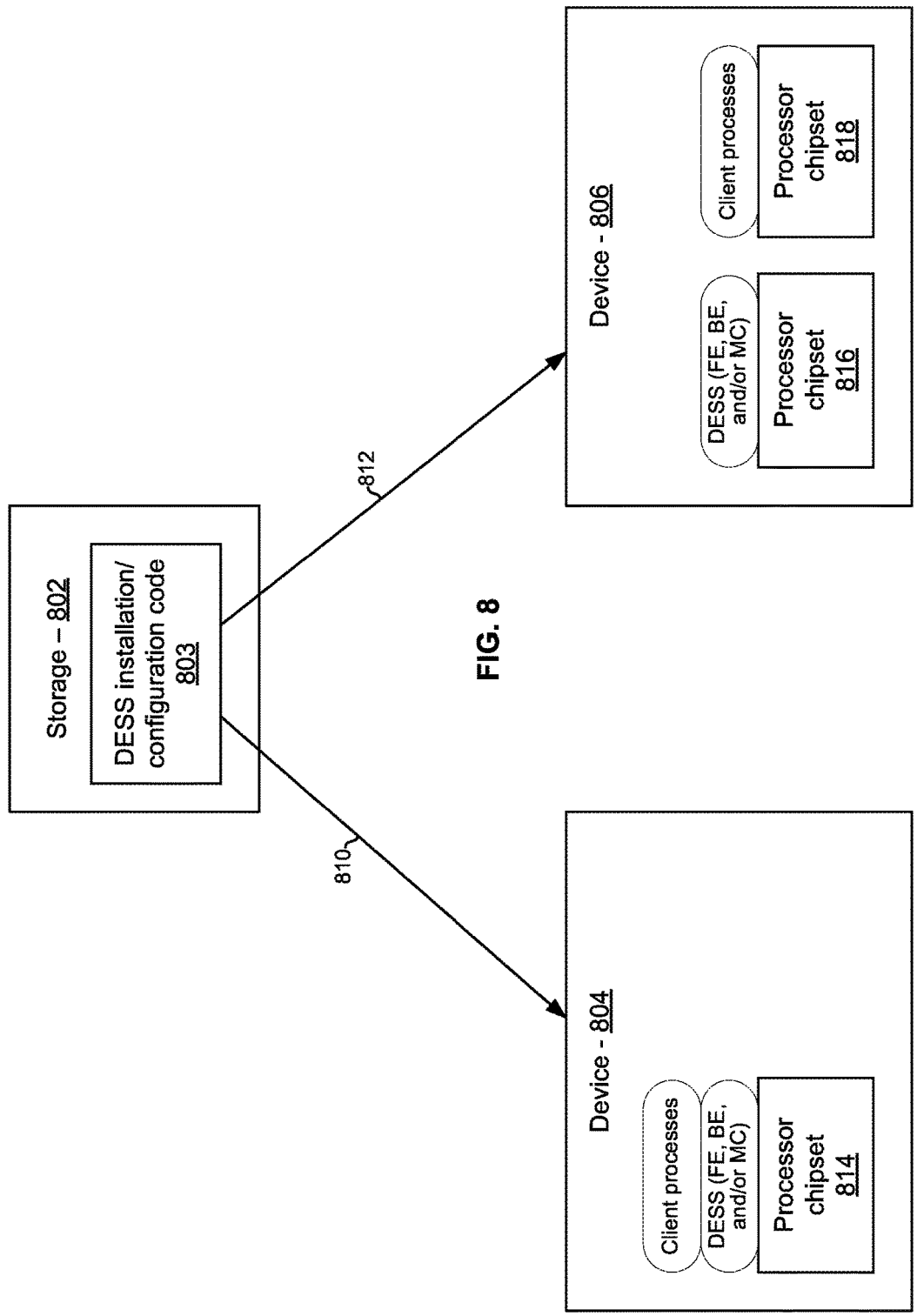
FIG. 8 is a block diagram illustrating configuration of a DESS from a non-transitory machine-readable storage media.

FIG. 8 is a block diagram illustrating configuration of a DESS from a non-transitory machine-readable storage media. Shown in FIG. 8 is non-transitory storage 802 on which resides code 803. The code is made available to computing devices 804 and 806 (which may be compute nodes, DESS nodes, and/or dedicated storage nodes such as those discussed above) as indicated by arrows 810 and 812. For example, storage 802 may comprise one or more electronically addressed and/or mechanically addressed storage devices residing on one or more servers accessible via the Internet and the code 803 may be downloaded to the devices 1004 and 1006. As another example, storage 802 may be an optical disk or FLASH-based disk which can be connected to the computing devices 804 and 806 (e.g., via USB, SATA, PCIe, and/or the like).

When executed by a computing device such as 804 and 806, the code 803 may install and/or initialize one or more of the DESS driver, DESS front-end, DESS back-end, DESS memory controller on the computing device. This may comprise copying some or all of the code 803 into local storage and/or memory of the computing device(s) 804 and/or 806 and beginning to execute the code 803 (launching one or more DESS processes) by one or more processors of the computing device(s) 804 and/or 806. Which of code corresponding to the DESS driver, code corresponding to the DESS front-end, code corresponding to the DESS back-end, and/or code corresponding to the DESS memory controller is copied to local storage and/or memory of the computing device(s) 804 and/or 806 and is executed by the computing device(s) 804 and/or 806 may be configured by a user during execution of the code 803 and/or by selecting which portion(s) of the code 803 to copy and/or launch. In the example shown, execution of the code 803 by the device 804 has resulted in one or more client processes and one or more DESS processes being launched on the processor chipset 814. That is, resources (processor cycles, memory, etc.) of the processor chipset 814 are shared among the client processes and the DESS processes. On the other hand, execution of the code 803 by the device 806 has resulted in one or more DESS processes launching on the processor chipset 816 and one or more client processes launching on the processor chipset 818. In this manner, the client processes do not have to share resources of the processor chipset 816 with the DESS process(es). The processor chipset 818 may comprise, for example, a process of a network adaptor of the device 806.

In accordance with an example implementation of this disclosure, one or more non-transitory machine-readable storage medium have code stored thereon, that, when executed by one or more of a plurality of computing devices (e.g., nodes $502_1$-$502_1$) of a DESS, configures the one or more computing devices to comprise congestion management circuitry (e.g., circuitry implementing choking process(es) 506 and centralized priority manager 530), one or more client file system request buffers (e.g., $504_1$ and $504_2$), and DESS interface circuitry (e.g., 520). The congestion management circuitry is operable to determine an amount of congestion in the DESS. The one or more client file system request buffers is/are operable to queue first client file system requests of a first priority level and second client file system requests of a second priority level, wherein the first priority level is higher priority than the second priority level. The DESS interface circuitry is operable to control a rate at which the first file system requests and second file system requests are fetched from the one or more client file system request buffers based on the amount of congestion in the DESS, on the first priority level, and on the second priority level. The code, when executed by the one or more computing devices, may configure the one or more computing devices to comprise queueing circuitry (e.g., 522). The queueing circuitry may be operable to receive a particular client file system request, and determine whether the particular client file system request is one of the first client file system requests or one of the second client file system requests based on a mount point to which the particular client file system request is directed. The queueing circuitry may be operable to receive a particular client file system request, queue the particular client file system request in a first of the one or more buffers if the particular client file system request is directed at a first mount point, and queue the particular client file system request in a second of the one or more buffers if the particular client file system request is directed at a second mount point. The first client file system requests may be directed to a file system mounted at a first mount point and the second client file system requests may be directed to a file system mounted at a second mount point. The file system mounted at the first mount point and the file system mounted at the second mount point may be the same file system. The DESS interface circuitry may be operable to fetch client file system requests from the one or more client file system request buffers in accordance with a round-robin schedule. The round-robin schedule may be such that, in each round of the round-robin, at least one client file system request directed to a file system mounted at a first mount point is fetched, and at least one client file system request directed to a file system mounted at a second mount point is fetched. The code, when executed by the one or more computing devices, may configure the one or more computing devices to comprise DESS priority management circuitry. The DESS priority management circuitry may be operable to determine, based on characteristics of a node of the DESS, a mount point at which a file system should be mounted on the node. The characteristics of the node may comprise a client process that runs on the node. The DESS interface circuitry may be operable to fetch both the first client file system requests and the second client file system requests when the amount of congestion in the DESS is below a threshold, and fetch the first client file system requests but not the second client file system requests when the amount of congestion in the DESS is above the threshold.

Figure 9A:
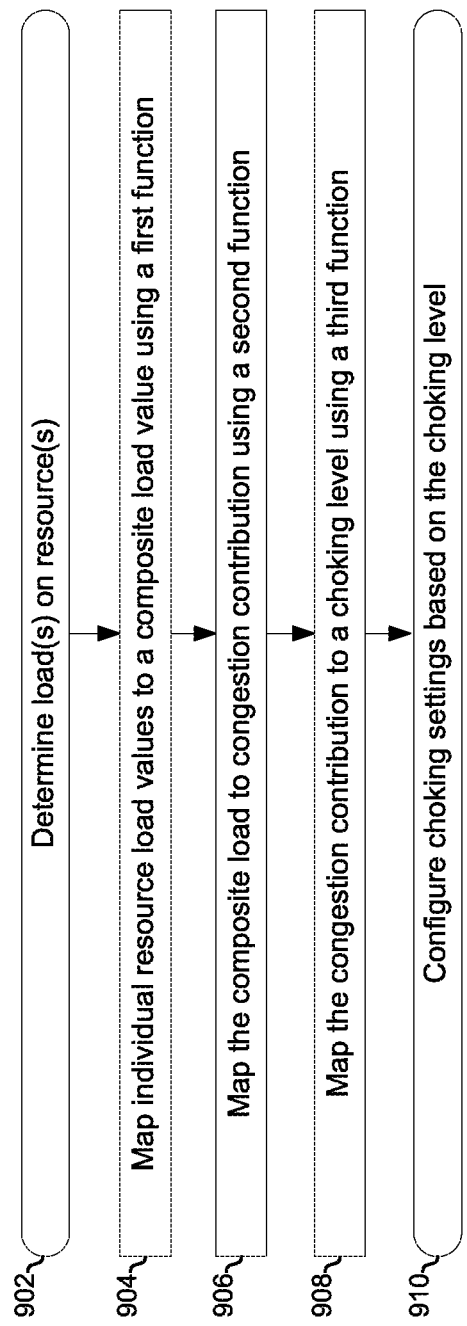
FIG. 9A is a flowchart illustrating an example method of configuring choking settings based on resource load.
Figure 9B:
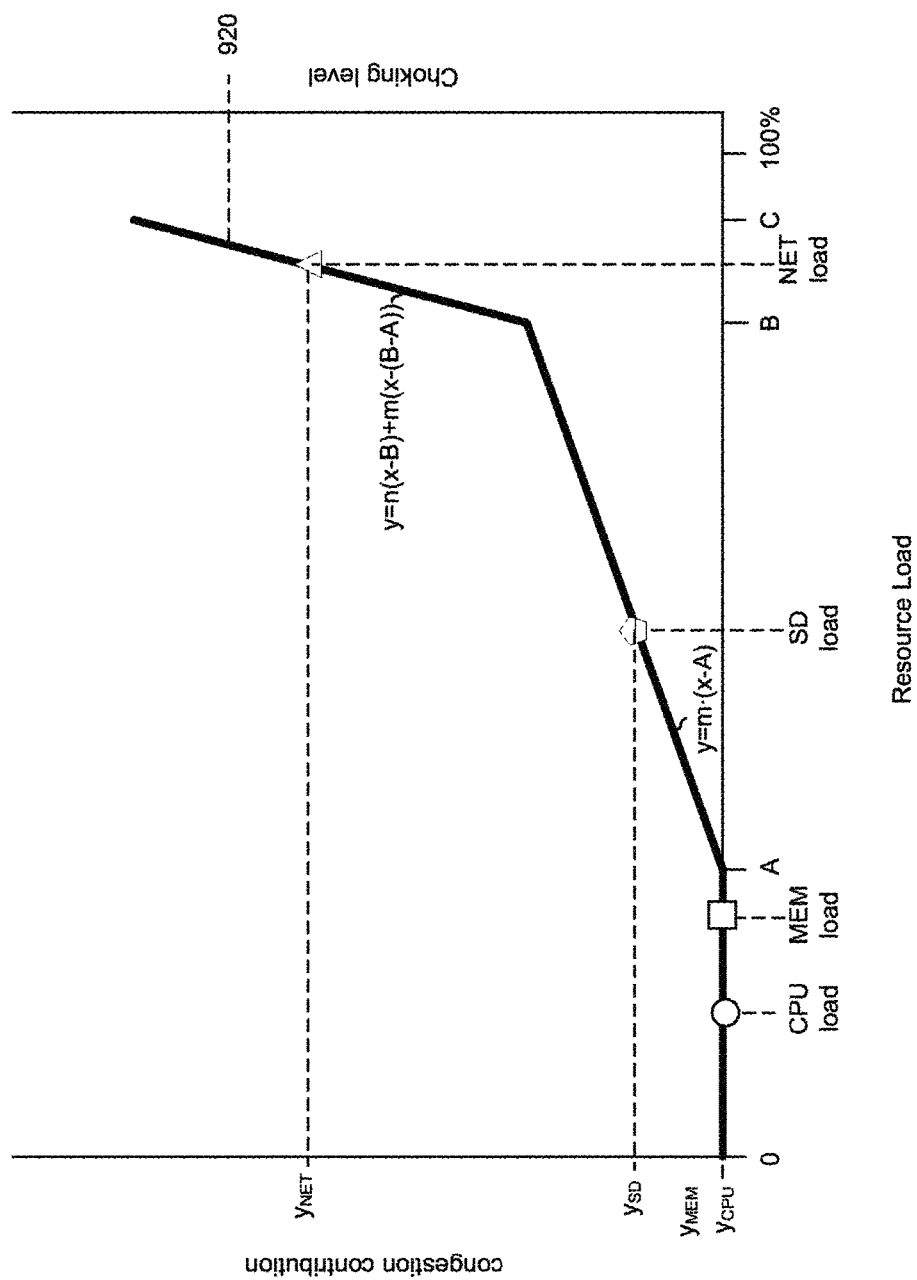
FIG. 9B illustrates application of the method of FIG. 9A for an example implementation.

FIG. 9A is a flowchart illustrating an example method of configuring choking settings based on resource load. The process begins in block 902 in which node $102_j$ determines the load on one or more local and/or remote resources of the DESS. As described above, this may include each node determining the load on its local resources (this may be a current measurement/estimation or prediction for some time in the future) and including this information (or derivatives thereof) in DESS messages sent to other nodes. The resource loads may, for example, be represented as a numerical value (e.g., on a scale of 0 to 7, using 3 bits).

In block 904, the node $102_j$ maps the individual load values for each resource to a composite load value using a first function. For example, in FIG. 9B, the node $102_j$ may generate a CPU load value, a memory load value, a storage device load value, and a network load value; and may also receive one or more CPU load values, one or more memory load values, one or more storage device load values, and one or more network load values from other nodes of the DESS. The node $102_j$ may then map the two or more CPU load values to a composite CPU load value, the two or more memory load values to a composite memory load value, the two or more storage device load values to a composite storage device load value, and the two or more network load values to a composite network load value. The first function may be, for example, a sum, an average, a weighted average (e.g., load values determined more recently given more weight than older values), or any other suitable function. These composite load values are shown along the X axis in FIG. 9B.

In block 906, the node $102_j$ maps each composite resource load value to a corresponding congestion contribution value using a second function. Any suitable function may be used. In the example implementations illustrated in FIG. 9B, the second function is the following piecewise linear function:

$$y = \begin{cases} 0, \text{ for } x < A \\ m \cdot (x - A), \text{ for } A \leq x \leq B \\ n \cdot (x - B) + m \cdot (x - (B - A)), \text{ for } x > B \end{cases}$$

One or more of the variables m, n, A, and B may be determined (e.g., preset by a DESS administrator and/or adapted using a learning algorithm) based on the determined type (e.g., CPU, memory, network, and storage device) of DESS resources. Although the same second function is shown as applying to all of the composite load values, this need not be the case. For example, one or more of the variables may take on first value(s) (which may vary based on determined characteristics as, for example, described above with reference to FIGS. 5A and 5B) when mapping the composite network load value and second value(s) (which may vary based on determined characteristics as, for example, described above with reference to FIGS. 5A and 5B) when mapping the composite storage device load value.

One or more of the variables m, n, A, and B may be determined based on characteristics of DESS resources (and may vary over time as the characteristics vary). For example, one or more of the variables may take on first value(s) for a first file system distributed across storage device(s) 306 having first characteristics and second value(s) for a second file system distributed across storage device(s) 306 having second characteristics. As another example, the variables may adapt over time as the resources age (e.g., as a storage device ages its characteristics may change).

Figure 9C:
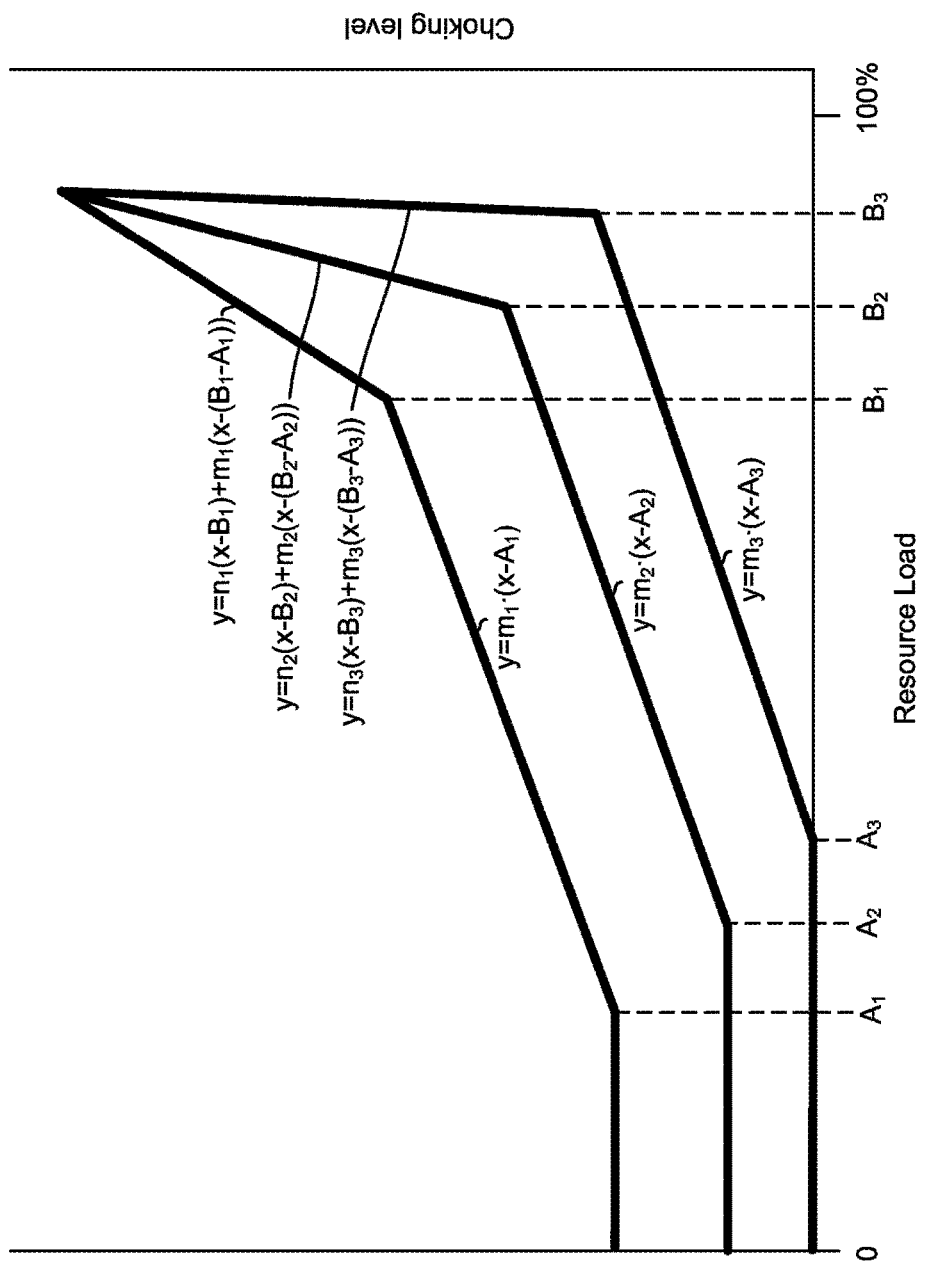
FIG. 9C illustrates a first example implementation in which different choking settings are generated for different file system request priority levels.

One or more of the variables m, n, A, and B may be determined based on the priority of the file system request which, as discussed above, may be determined based on the mount point to which the file system request is directed. FIG. 9C, discussed below, illustrates an example where three different sets of values for variables m, n, A, and B are used for three different file system request priority levels. In another implementation, different second functions (rather than the same function with three different sets of variable values) may be used for different file system request priority levels.

In block 908, the congestion contributions are mapped to a choking level using a third function. The third function may be, for example, a sum, an average, a weighted average, or any other suitable function. In the example implementation of FIG. 9B, the third function is the sum of the congestion contribution levels, resulting in choking level 920. The third function may be determined based on characteristics of DESS resources and may adapt as the characteristics change over time.

In block 910, the congestion settings, such as one or more batch timing settings and/or one or more batch size settings, are configured based on the determined choking level. For example, choking level may be mapped to such settings using a lookup table or one or more fourth functions. The lookup table or fourth function(s) may be set by a DESS administrator and/or adapt based on a learning algorithm (e.g., set and/or adapted based on DESS characteristics and/or changes in the characteristics over time).

In various example implementations, changes to choking level, changes to function variables, and/or changes to any other configuration changes may be limited by hysteresis settings (which themselves may be user-defined and/or adaptive) and/or may updated in a moving average fashion so as to reduce jitter, oscillations, etc. in the values.

FIG. 9C illustrates a first example implementation in which different choking settings are used for different file system request priority levels. In FIG. 9C variables of the second function are set to $n_1, m_1, A_1,$ and $B_1$ for low-priority traffic, variables of the second function are set to $n_2, m_2, A_2,$ and $B_2$ for medium-priority traffic, and variables of the second function are set to $n_3, m_3, A_3,$ and $B_3$ for high-priority traffic. As a result, the choking level rises faster for low-priority traffic than for medium-priority traffic, and the choking level for medium-priority traffic rises faster than the choking level for high-priority traffic. Thus, for a given load on DESS resources (i.e., a given point along the x axis in FIG. 9C), the choking level may be different for each of the priority levels. For example, for some particular load on DESS resources, batch timing interval and/or batch size settings may be configured such that X low-priority file system requests are fetched/serviced per second, Y medium-priority file system requests are fetched/serviced per second, and Z high-priority file system requests are fetched/serviced per second (where $X \leq Y \leq Z$).

Figure 9D:
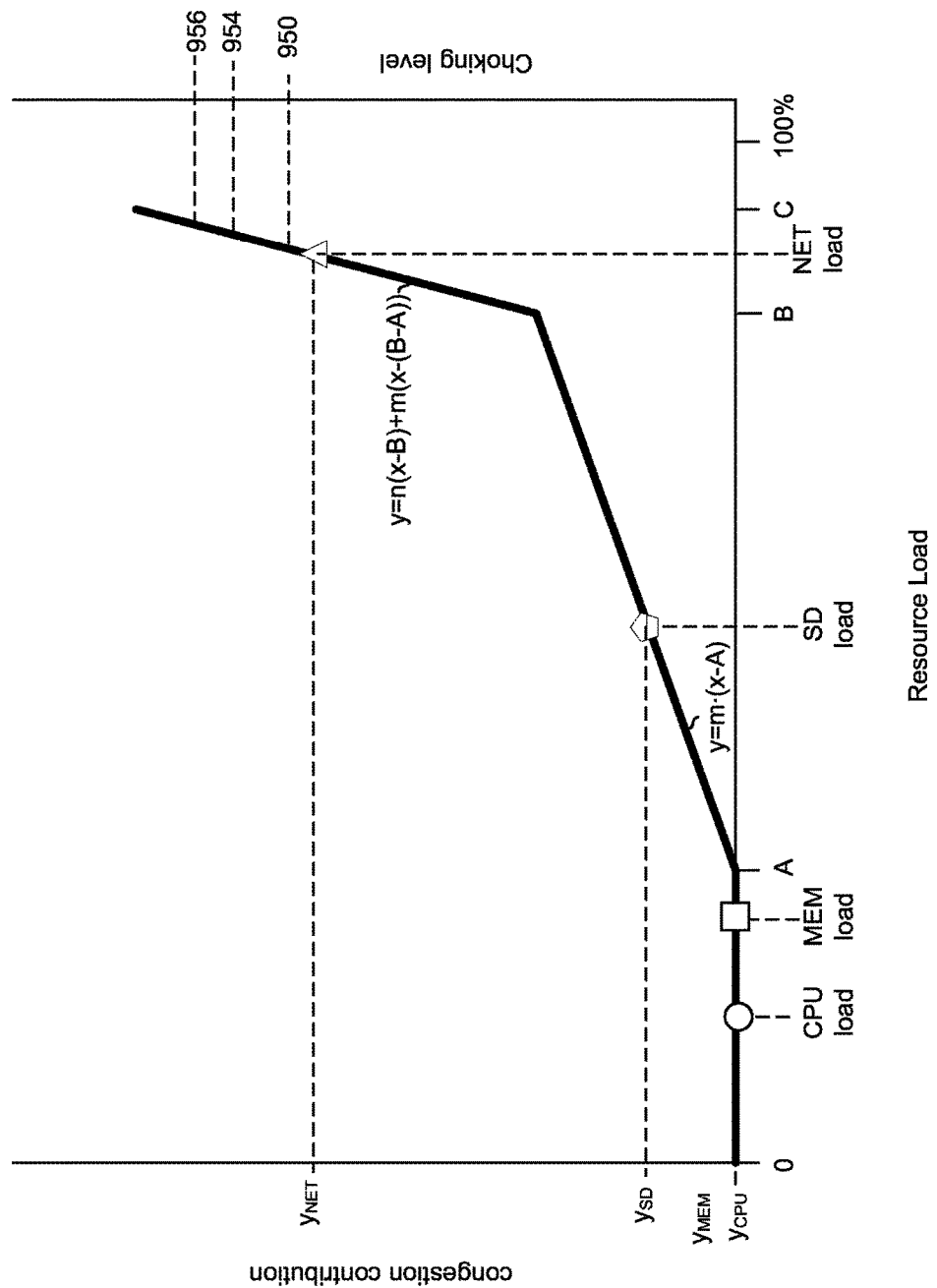
FIG. 9D illustrates a second example implementation in which different choking settings are generated for different file system request priority levels.

FIG. 9D illustrates a second example implementation in which different choking settings are used for different file system request priority levels. In FIG. 9D a different third function is used for each of low-priority file system requests, medium-priority file system requests, and high-priority file system requests. In this manner, the congestion contributions of $y_{CPU}, y_{MEM}, y_{SD},$ and $y_{NET}$ shown in FIG. 9D result in a choking level of 956 for low-priority file system requests, 954 for medium-priority file system requests, and 950 for high-priority file system request.

Thus, the present methods and systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Other typical implementations comprise an application specific integrated circuit (e.g., either on a chip or as a printed circuit assembly). Some implementations may comprise a non-transitory machine-readable storage medium (e.g., FLASH drive(s), optical disk(s), magnetic storage disk(s), and/or the like) having stored thereon one or more lines of code executable by a computing device, thereby configuring the machine to be configured to implement one or more aspects of the methods and systems described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
   congestion management circuitry operable to determine an amount of congestion in a distributed electronic storage system (DESS);
   one or more client file system request buffers operable to queue first client file system requests of a first priority level and second client file system requests of a second priority level, wherein the first priority level is higher priority than the second priority level; and
   DESS interface circuitry operable to determine a choking level according to a load on a plurality of DESS resources, wherein individual load values of the plurality of DESS resources are mapped to a composite load value using a first function, the composite load value is mapped to a congestion contribution using a second function, and the congestion contribution is mapped to a choking level using a third function, wherein the DESS interface circuitry is operable to dynamically update the choking level according to a normalization of each file system request and a level of file system requests previously queued in the one or more client file system request buffers.

2. The system of claim 1, comprising queueing circuitry operable to:
   receive a particular client file system request; and
   determine whether the particular client file system request is one of the first client file system requests or one of the second client file system requests based on a mount point to which the particular client file system request is directed.

3. The system of claim 1, comprising queueing circuitry operable to:
   receive a particular client file system request;
   queue the particular client file system request in a first of the one or more buffers if the particular client file system request is directed at a first mount point; and
   queue the particular client file system request in a second of the one or more buffers if the particular client file system request is directed at a second mount point.

4. The system of claim 1, wherein the first client file system requests are directed to a file system mounted at a first mount point and the second client file system requests are directed to a file system mounted at a second mount point.

5. The system of claim 4, wherein the file system mounted at the first mount point and the file system mounted at the second mount point are the same file system.

6. The system of claim 1, wherein the DESS interface circuitry is operable to fetch client file system requests from the one or more client file system request buffers in accordance with a round-robin schedule and one or more choking levels.

7. The system of claim 6, wherein the round-robin schedule is such that, in each round of the round-robin:
   at least one client file system request directed to a file system mounted at a first mount point is fetched; and
   at least one client file system request directed to a file system mounted at a second mount point is fetched.

8. The system of claim 1, comprising DESS priority management circuitry operable to determine, based on characteristics of a node of the DESS, where to mount a file system.

9. The system of claim 8, wherein the characteristics of the node comprise a client process that runs on the node.

10. The system of claim 1, wherein the DESS interface circuitry is operable to:
    fetch both the first client file system requests and the second client file system requests when the amount of congestion in the DESS is below a threshold; and
    fetch the first client file system requests but not the second client file system requests when the amount of congestion in the DESS is above the threshold.

11. One or more non-transitory machine-readable storage medium having code stored thereon, that, when executed by one or more of a plurality of computing devices of a distributed electronic storage system (DESS), configures the one or more computing devices to comprise:

congestion management circuitry operable to determine an amount of congestion in a distributed electronic storage system (DESS);

one or more client file system request buffers operable to queue first client file system requests of a first priority level and second client file system requests of a second priority level, wherein the first priority level is higher priority than the second priority level; and DESS interface circuitry operable to determine a choking level according to a load on a plurality of DESS resources, wherein individual load values of the plurality of DESS resources are mapped to a composite load value using a first function, the composite load value is mapped to a congestion contribution using a second function, and the congestion contribution is mapped to a choking level using a third function, wherein the DESS interface circuitry is operable to dynamically update the choking level according to a normalization of each file system request and a level of file system requests previously queued in the one or more client file system request buffers.

12. The one or more non-transitory machine-readable storage medium of claim 11, wherein the code, when executed by the one or more computing devices, configures the one or more computing devices to comprise queueing circuitry operable to:

receive a particular client file system request; and determine whether the particular client file system request is one of the first client file system requests or one of the second client file system requests based on a mount point to which the particular client file system request is directed.

13. The one or more non-transitory machine-readable storage medium of claim 11, wherein the code, when executed by the one or more computing devices, configures the one or more computing devices to comprise queueing circuitry operable to:

receive a particular client file system request;

queue the particular client file system request in a first of the one or more buffers if the particular client file system request is directed at a first mount point; and queue the particular client file system request in a second of the one or more buffers if the particular client file system request is directed at a second mount point.

14. The one or more non-transitory machine-readable storage medium of claim 11, wherein the first client file system requests are directed to a file system mounted at a first mount point and the second client file system requests are directed to a file system mounted at a second mount point.

15. The one or more non-transitory machine-readable storage medium of claim 14, wherein the file system mounted at the first mount point and the file system mounted at the second mount point are the same file system.

16. The one or more non-transitory machine-readable storage medium of claim 11, wherein the DESS interface circuitry is operable to fetch client file system requests from the one or more client file system request buffers in accordance with a round-robin schedule and one or more choking levels.

17. The one or more non-transitory machine-readable storage medium of claim 16, wherein the round-robin schedule is such that, in each round of the round-robin:

at least one client file system request directed to a file system mounted at a first mount point is fetched; and at least one client file system request directed to a file system mounted at a second mount point is fetched.

18. The one or more non-transitory machine-readable storage medium of claim 11, wherein the code, when executed by the one or more computing devices, configures the one or more computing devices to comprise DESS priority management circuitry operable to determine, based on characteristics of a node of the DESS, where to mount a file system.

19. The one or more non-transitory machine-readable storage medium of claim 18, wherein the characteristics of the node comprise a client process that runs on the node.

20. The one or more non-transitory machine-readable storage medium of claim 11, wherein the DESS interface circuitry is operable to:

fetch both the first client file system requests and the second client file system requests when the amount of congestion in the DESS is below a threshold; and fetch the first client file system requests but not the second client file system requests when the amount of congestion in the DESS is above the threshold.

* * * * *